(12) United States Patent
Gu

(10) Patent No.: US 10,048,961 B2
(45) Date of Patent: *Aug. 14, 2018

(54) DISTRIBUTED PARALLEL BUILD SYSTEM

(71) Applicant: eBay Inc., San Jose, CA (US)

(72) Inventor: Kevin Gu, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/378,613

(22) Filed: Dec. 14, 2016

(65) Prior Publication Data

US 2017/0097821 A1 Apr. 6, 2017

Related U.S. Application Data

(63) Continuation of application No. 14/635,818, filed on Mar. 2, 2015, now Pat. No. 9,529,589, which is a continuation of application No. 13/903,614, filed on May 28, 2013, now Pat. No. 8,972,937, which is a continuation of application No. 11/526,310, filed on Sep. 25, 2006, now Pat. No. 8,458,661.

(60) Provisional application No. 60/744,039, filed on Mar. 31, 2006.

(51) Int. Cl.
*G06F 9/44* (2018.01)
*G06F 8/70* (2018.01)
*G06F 8/41* (2018.01)

(52) U.S. Cl.
CPC . *G06F 8/70* (2013.01); *G06F 8/41* (2013.01)

(58) Field of Classification Search
CPC ...................................................... G06F 8/70

USPC .......................... 717/101–108, 120–122, 116
See application file for complete search history.

(56) References Cited

U.S. PATENT DOCUMENTS

| | | | |
|---|---|---|---|
| 5,649,200 A | 7/1997 | Leblang et al. | |
| 6,093,215 A | 7/2000 | Buxton et al. | |
| 6,223,342 B1 * | 4/2001 | George | G06F 17/30958 707/E17.011 |
| 6,266,805 B1 | 7/2001 | Nwana et al. | |
| 6,298,476 B1 | 10/2001 | Misheski et al. | |
| 6,321,158 B1 | 11/2001 | Delorme et al. | |

(Continued)

OTHER PUBLICATIONS

Woodside et al, "Performance by Unified Model Analysis (PUMA)", ACM, pp. 1-12, 2005.*

(Continued)

*Primary Examiner* — Anil Khatri
(74) *Attorney, Agent, or Firm* — Schwegman Lundberg & Woessner, P.A.

(57) ABSTRACT

This document describes, among other things, systems and methods for managing distributed parallel builds. A computer-implemented method to manage parallel builds, comprises identifying one or more software components in a software project, wherein each software component includes an executable binary file; determining a build configuration for each software component, wherein the build configuration includes a mapping from each software component to one or more build servers; and building each software component using the mapped one or more build servers in the corresponding build configuration, wherein the building includes compiling one or more source files associated with each software component to one or more object files, by distributing the one or more source files to one or more compilation machines.

20 Claims, 6 Drawing Sheets

(56) References Cited

U.S. PATENT DOCUMENTS

| | | | |
|---|---|---|---|
| 6,405,364 B1* | 6/2002 | Bowman-Amuah | G06F 8/20 717/101 |
| 6,438,744 B2 | 8/2002 | Toutonghi et al. | |
| 6,775,829 B1 | 8/2004 | Kroening | |
| 6,928,637 B2 | 8/2005 | Leherbauer | |
| 6,938,240 B2 | 8/2005 | Charisius et al. | |
| 7,003,759 B2 | 2/2006 | Jameson | |
| 7,069,541 B2 | 6/2006 | Dougherty et al. | |
| 7,076,784 B1* | 7/2006 | Russell | G06F 9/4428 707/999.103 |
| 7,093,232 B1* | 8/2006 | Chatzigianis | G06F 8/71 717/122 |
| 7,131,112 B1 | 10/2006 | Bartz et al. | |
| 7,168,064 B2 | 1/2007 | Ousterhout et al. | |
| 7,266,805 B2* | 9/2007 | Weidman | G06F 8/71 717/101 |
| 7,412,685 B2* | 8/2008 | Miller | G06F 8/20 717/101 |
| 7,428,726 B1 | 9/2008 | Cowan et al. | |
| 7,448,022 B1* | 11/2008 | Ram | G06F 8/00 717/120 |
| 7,472,374 B1 | 12/2008 | Dillman et al. | |
| 7,516,438 B1 | 4/2009 | Leonard et al. | |
| 7,516,439 B2* | 4/2009 | Robinson | G06F 8/00 707/999.101 |
| 7,539,972 B2 | 5/2009 | Wang | |
| 7,539,976 B1 | 5/2009 | Ousterhout et al. | |
| 7,596,782 B2 | 9/2009 | Ebbo et al. | |
| 7,614,040 B2* | 11/2009 | Wagner | G06F 8/71 717/120 |
| 7,640,533 B1 | 12/2009 | Lottero et al. | |
| 7,673,295 B1 | 3/2010 | Lin | |
| 7,730,448 B2 | 6/2010 | Meijer et al. | |
| 7,761,851 B2 | 7/2010 | Bailey et al. | |
| 7,802,228 B2 | 9/2010 | Madkour et al. | |
| 7,805,706 B1 | 9/2010 | Ly et al. | |
| 7,904,877 B2 | 3/2011 | Multerer et al. | |
| 7,930,676 B1* | 4/2011 | Thomas | G06F 9/44505 706/45 |
| 8,037,453 B1 | 10/2011 | Zawadzki | |
| 8,042,089 B2* | 10/2011 | Ousterhout | G06Q 10/06 717/101 |
| 8,042,098 B2 | 10/2011 | Do et al. | |
| 8,065,658 B1* | 11/2011 | Bali | G06F 8/70 717/113 |
| 8,151,245 B2 | 4/2012 | Oberlin et al. | |
| 8,201,148 B2 | 6/2012 | Solirov et al. | |
| 8,219,974 B2* | 7/2012 | Schmidt | G06Q 50/18 717/120 |
| 8,291,378 B2 | 10/2012 | Arnold et al. | |
| 8,327,330 B1 | 12/2012 | Yang et al. | |
| 8,458,661 B2 | 6/2013 | Gu | |
| 8,572,550 B2 | 10/2013 | Fox et al. | |
| 8,589,868 B2* | 11/2013 | Monaghan | G06F 8/34 235/379 |
| 8,601,433 B2 | 12/2013 | Son et al. | |
| 8,613,936 B2 | 12/2013 | Hausmann et al. | |
| 8,621,416 B1 | 12/2013 | Thomas | |
| 8,683,433 B2 | 3/2014 | Nayak et al. | |
| 8,694,968 B2* | 4/2014 | Eteminan | G06F 8/20 717/103 |
| 8,701,083 B2 | 4/2014 | Madkour et al. | |
| 8,713,527 B2 | 4/2014 | Frontiero et al. | |
| 8,719,767 B2 | 5/2014 | Bansod | |
| 8,726,231 B2* | 5/2014 | Sirr | G06F 8/35 717/104 |
| 8,850,391 B1 | 9/2014 | Lin et al. | |
| 8,972,937 B2 | 3/2015 | Gu | |
| 9,009,658 B2 | 4/2015 | Sundararajan et al. | |
| 9,134,962 B1* | 9/2015 | Stephens | G06F 8/20 |
| 9,189,227 B2* | 11/2015 | Johansson | G06F 8/70 |
| 9,442,717 B2* | 9/2016 | Rohan | G06F 8/71 |
| 9,524,192 B2* | 12/2016 | van Velzen | G06F 9/5038 |
| 9,529,589 B2 | 12/2016 | Gu | |
| 2002/0087886 A1 | 7/2002 | Ellis | |
| 2003/0014739 A1 | 1/2003 | Aubertine | |
| 2003/0200536 A1 | 10/2003 | Stuefe | |
| 2004/0031014 A1 | 2/2004 | Baecker et al. | |
| 2004/0193368 A1 | 9/2004 | Sanqunetti | |
| 2004/0194060 A1 | 9/2004 | Ousterhout et al. | |
| 2004/0194075 A1 | 9/2004 | Molchanov et al. | |
| 2005/0246711 A1 | 11/2005 | Berstis et al. | |
| 2007/0006041 A1 | 1/2007 | Brunswig et al. | |
| 2007/0169027 A1 | 7/2007 | Drepper | |
| 2007/0234320 A1 | 10/2007 | Gu | |
| 2009/0070750 A9 | 3/2009 | Gu | |
| 2013/0268915 A1 | 10/2013 | Gu | |
| 2015/0169322 A1 | 6/2015 | Gu | |

OTHER PUBLICATIONS

Batory et al, "The Design and Implementation of Hierarchical Software Systems with Reusable Components", ACM Transactions on Software Engmeermg and Methodology, vol. 1, No. 4, pp. 354-398, 1992.*

Bachiller et al, "Building Smart Environments with LooCI", ACM, pp. 1-2, 2012.*

Burg et al, "Tracing Software Build Processes to Uncover License Compliance Inconsistencies", ACM, pp. 731-741, 2014.*

Coulson et al, "A Generic Component Model for Building Systems Software", ACM Transactions on Computer Systems, vol. 26, No. 1, Article 1, pp. 1-42, 2008.*

Yoon et al, "Towards Incremental Component Compatibility Testing", ACM, pp. 119-128, 2011.*

Ommering, "Building Product Populations with Software Components", ACM, pp. 255-265, 2002.*

Ornburn et al, "Building, Modifying and Using Component Generators", IEEE, pp. 391-402, 1993.*

"U.S. Appl. No. 11/526,310, 312 Amendment filed May 17, 2013", 7 pgs.

"U.S. Appl. No. 11/526,310, Final Office Action dated Oct. 27, 2010", 16 pgs.

"U.S. Appl. No. 11/526,310, Non-Final Office Action dated Mar. 5, 2010", 21.

"U.S. Appl. No. 11/526,310, Notice of Allowance dated Feb. 7, 2013", 17 pgs.

"U.S. Appl. No. 11/526,310, Preliminary Amendment filed Oct. 24, 2006", 3 pgs.

"U.S. Appl. No. 11/526,310, Response filed Aug. 5, 2010 to Non Final Office Action dated Mar. 5, 2010", 9 pgs.

"U.S. Appl. No. 11/526,310, Response filed Dec. 20, 2010 to Final Office Action dated Oct. 27, 2010", 9 pgs.

"U.S. Appl. No. 13/903,614, Non Final Office Action dated Jul. 3, 2014", 7 pgs.

"U.S. Appl. No. 13/903,614, Notice of Allowance dated Oct. 27, 2014", 10 pgs.

"U.S. Appl. No. 13/903,614, Preliminary Amendment filed Nov. 27, 2013", 8 pgs.

"U.S. Appl. No. 13/903,614, Response filed Sep. 29, 2014 to Non Final Office Action dated Jul. 3, 2014", 9 pgs.

"U.S. Appl. No. 14/635,818, Final Office Action dated May 16, 2016", 8 pgs.

"U.S. Appl. No. 14/635,818, First Action Interview—Pre-Interview Communication dated Feb. 4, 2016", 8 pgs.

"U.S. Appl. No. 14/635,818, First Action Interview—Response Filed Mar. 4, 2016 to Pre-Interview Communication dated Feb. 4, 2016", 7 pgs.

"U.S. Appl. No. 14/635,818, Notice of Allowance dated Aug. 26, 2016", 10 pgs.

"U.S. Appl. No. 14/635,818, Response filed Aug. 15, 2016 to Final Office Action dated May 16, 2016", 6 pgs.

"U.S. Appl. No. 14/635,818, Preliminary Amendment filed Mar. 30, 2015", 6 pgs.

"Chapter 5. Building Software with ClearCase", From CASEVisionÂ?/ClearCase Concepts Guide, Document No. 007-1612-020, [Online]. Retrieved from the Internet: <URL: http://

(56) References Cited

OTHER PUBLICATIONS techpubs.sgi.com/library/dynaweb_docs/0620/SGI_Developer/books/CIrC_CG/sgi_html/ch05.html>, (Copyright 1992 & 1994).
Alegria, et al., "Building Software Process Lines with CASPER", IEEE, (2012), 170-179 pgs.
Bouchet, et al., "ICARE Software Components for Rapidly Developing Multimodal Interfaces", (2004), 251-258 pgs.
Breddin, Tino, "Using Erlang to Implement a Autonomous Build and Distribution System for Software Projects", ACM, (Sep. 30, 2010), 81-85.
Carvalho-Junior, et al., "On the design of abstract bining connectors for high performance computing component models", ACM, (2007), 67-76.
Chaudhari, et al., "Towards a Ranking Framework for Software Components", (2013), 495-496 pgs.
D, Ambrogio, "A Model Transformation Framework for the Automated Building of Performance Models from UML Models", ACM, (2005), 75-86 pgs.
Ding, Chen, et al., "Software Behavior Oriented Parallelization", ACM, (Jun. 13, 2007), 223-243.
Font, et al., "Building Software Product Lines from Conceptualized Model Patterns", ACM, (2015), 46-55 pgs.
Funk, et al., "Application of a development time productivity metric to parallel software development", ACM, (2005), 8-12.
Gill, "Importance of Software Component Characterization for Better Software Reusability", ACM SIGSOFT Software Engineering Notes, vol. 31, (2006), 1-3 pgs.
Israr, et al., "Automatic Generation of Layered Queuing Software Performance Models from Commonly Available Traces", ACM, (2005), 147-158 pgs.
Eon, Donghwan, et al., "Kismet: Parallel Speedup Estimates for Serial Programs", ACM, (Oct. 27, 2011), 519-536.
Martino, et al., "An automated algorithmic recognition technique to support parallel software development". IEEE, (1997), 120-129.
Russo, "PARSE and DISC integration for parallel software development", IEEE, (1996), 279-286.
Shihab, et al., "The effect of branching strategies on software quality", ACM ESEM, (2012), 301-310.
Sigonneau, et al., "Software Engineering Applications of Logic File System", (2006), 87-93 pgs.
Unphon, H, "Making Use of Architecture throughout the Software Life Cycle—How the Build Hierarchy can Facilitate Product Line Development", IEEE, (2009), 41-48.
Wimalasuriya, et al., "Componenets for Information Extraction: Ontology-Based Information Extractors and Generic Platforms", (2010), 9-18 pgs.
Yoon, et al., "Towards Incremental Component Compatibility Testing", (2011), 119-129 pgs.

\* cited by examiner

| COMPONENT | SERVERS |
|---|---|
| USER ACCOUNT MODULE | DEV_0, DEV_1, DEV_2 |
| PAYMENT SYSTEM | DEV_3, DEV_4 |
| SHOPPING CART | DEV_5, DEV_7 |
| CATALOG INTERFACE | DEV_10, DEV_8 |
| FEEDBACK MODULE | DEV_11, DEV_12, DEV_6 |

DISTRIBUTED PARALLEL BUILD SYSTEM

RELATED PATENT DOCUMENTS

This application is a continuation of U.S. patent application Ser. No. 14/635,818 filed Mar. 2, 2015, which is a continuation of U.S. patent application Ser. No. 13/903,614 filed May 28, 2013, now U.S. Pat. No. 8,972,937 which is a continuation of U.S. patent application Ser. No. 11/526,310 filed Sep. 25, 2006, now U.S. Pat. No. 8,458,661, which claims the benefit of priority to U.S. Provisional Patent Application Ser. No. 60/744,039, filed on Mar. 31, 2006, the contents of which are hereby incorporated by reference in their entirety.

TECHNICAL FIELD

Embodiments relate generally to the field of software development, and more specifically to methods and systems that build software projects in parallel.

BACKGROUND

The software development process usually involves several steps including analyzing requirements, drafting specifications, designing the software architecture, coding, testing and debugging, and maintenance. During the coding, testing, and debugging stages some or all of a software project is built using tools such as a compiler and a linker. In a complex software project, builds may take long periods of time, causing an inefficient use of software development resources.

DETAILED DESCRIPTION

Methods and systems to manage software builds in a network-based system are described. In the following description, for purposes of explanation, numerous specific details are set forth in order to provide a thorough understanding of embodiments of the inventive subject matter. It will be evident, however, to one skilled in the art that embodiments of the inventive subject matter may be practiced without these specific details.

For the purposes of this document, "software component" includes any independent binary or independent executable software module, such as library files (e.g., dynamically linked libraries or DLL), executable files (e.g., applications or .exe files), or services (e.g., daemons). Other types of independent binaries are included as understood by one of ordinary skill in the art.

Figure 1:
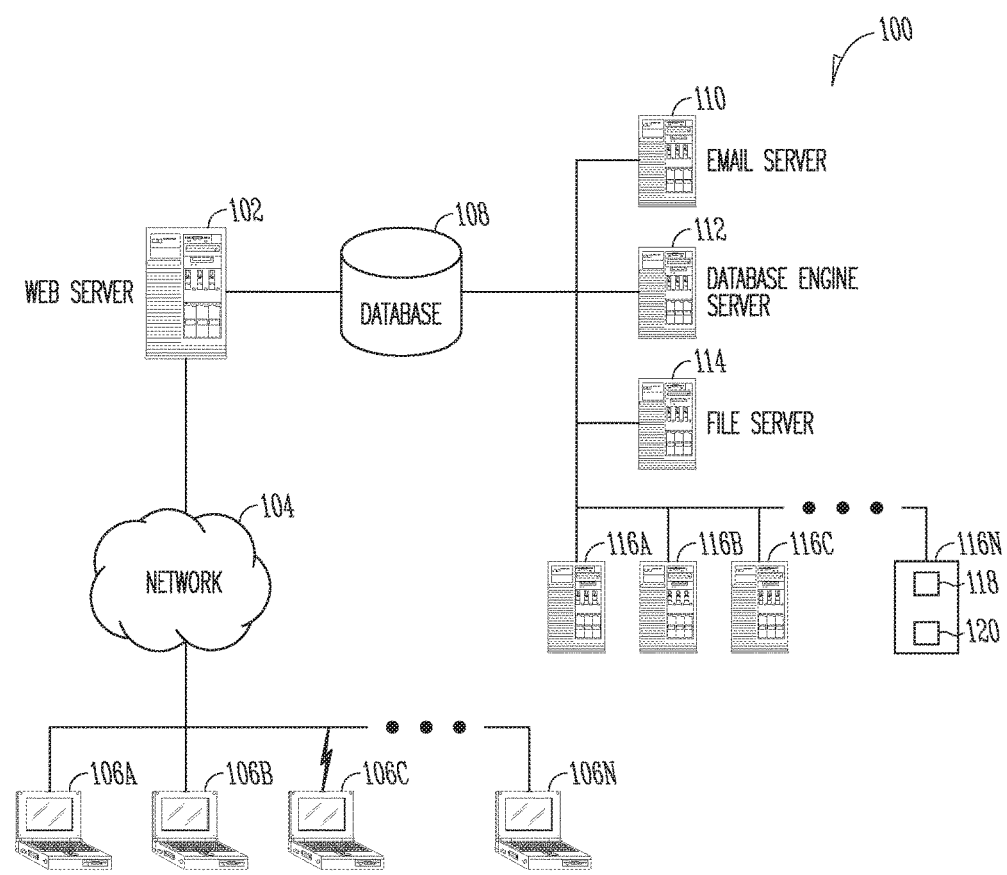
FIG. 1 illustrates a schematic block diagram of a network-based system, in accordance with an example embodiment.

FIG. 1 illustrates a schematic block diagram of a network-based system 100, in accordance with an example embodiment. The network-based system 100 includes a web server 102, which can communicate over a network 104 with one or more terminals 106A, 106B, 106C, ..., 106N. In various embodiments, portions of the network 104 may include wired or wireless networking. The terminals 106 can connect to the network 104 using wired or wireless communication. The web server 102 is communicatively coupled to a database 108 and other backend servers, such as an email server 110, a database engine server 112, and a file server 114. Additionally, the system 100 includes one or more build servers 116A, 116B, 116C, ..., 116N. In embodiments, the build servers 116 may include any type of computer including a laptop, desktop, blade server, network server, or the like. In addition, build servers 116 may include one or more software compilers 118 or linkers 120.

In an embodiment, a user (e.g., a software developer) can use a terminal machine 106 to control software builds using a web-based user-interface provided by the web server 102. In an embodiment, a user (e.g., a software developer) can use a terminal machine 106 to control software builds using a web-based user-interface provided by the web server 102. During a typical software development phase, the user may write and edit files, which are part of a software project. At some time, the user may desire to build the project. Building the project may involve compiling one or more files and then linking them into one or more files (e.g., executable or library files). In an embodiment, the user can initiate such a build process using the user-interface provided by the web server 102. Upon receiving such a request, the web server 102 communicates with the database engine server 112. Communication may include information such as user identification, project identification, build destination, and other pertinent information. The database engine server 112 can then communicate with the database 108 to determine the files needed and the correct commands to issue to the build servers 116. Files may be stored in the database 108 or on a file server 114. Files for each particular software component are associated with one or more build servers 116 in a distributed manner. In an embodiment, each build server 116 contains a compiler and a linker. The files are transmitted to the associated build servers 116, where they are compiled and linked. After each software component is compiled and linked on the distributed build servers 116, the software project (e.g., the collection of the particular software components) is transmitted to a development or a release area.

Figure 2:
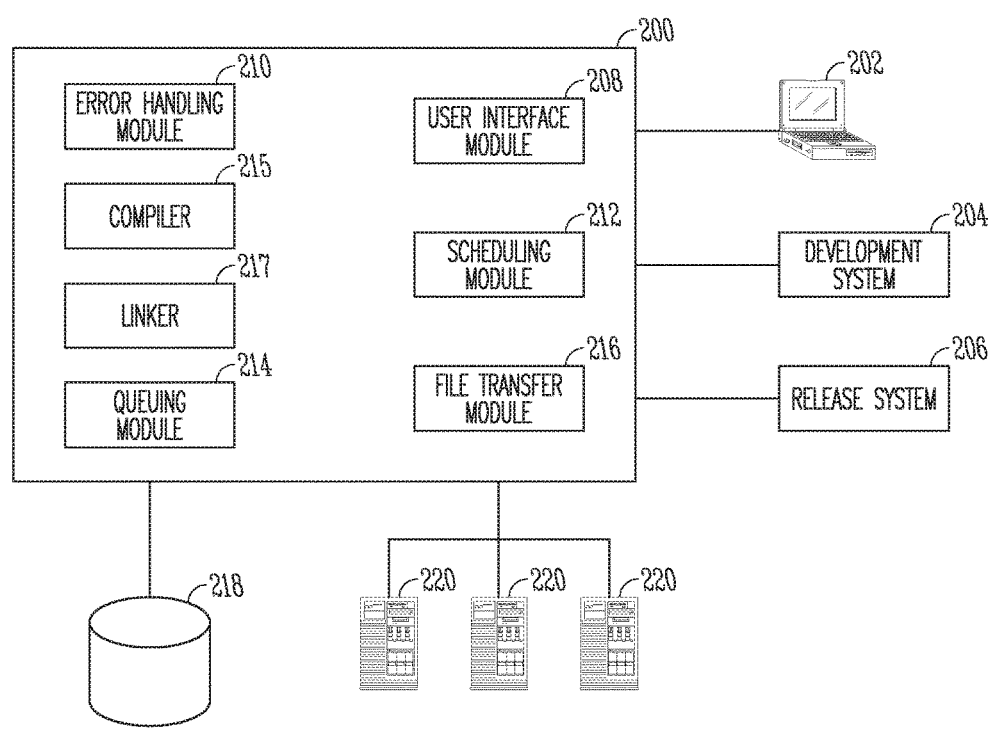
FIG. 2 illustrates a schematic block diagram of a build manager, in accordance with an example embodiment.

FIG. 2 illustrates a schematic block diagram of a build manager 200, in accordance with an example embodiment. The build manager 200 may operate, in some embodiments, as a build server 220. In such an embodiment, the build manager 200 can compile one or more files while also coordinating the distributed parallel build process. Alternatively, the build manager 200 may be solely operated as a controller machine: taking commands from a client machine 202, managing the build process, and placing final builds on either a development system 204 or a release system 206.

In an embodiment, the build manager 200 includes a user interface module an error handling module 210, a scheduling module 212, a queuing module 214, a file transfer module 216, a compiler 215, and a linker 217. Users (e.g., software developers) may connect with the build machine 200 from their client machines 202 to issue one or more commands that control software builds. For example, a user may issue a command via the user interface module 208 to schedule a build or a series of builds, cancel a build or check the status of a build.

The scheduling module 212 may be used to schedule one or more builds in the future. In an embodiment, users can schedule one or more builds to commence at a specific time or date. In another embodiment, users can schedule periodic or recurring builds. Schedules of periodic or recurring builds may have a terminating date or time, such that software projects will regularly re-build until the terminating date or time.

The error handling module 210 detects errors that may occur before or during a build. In an embodiment, detected errors are logged to a database 218 or a file. Users may, in some embodiments, view the errors stored in the database 218 using the user interface module 208. In some embodiments, the error handling module 210 may communicate with one or more modules to control current or later builds. For example, if a build fails and the error handling module 210 detects a certain type of error or a certain degree of error, the error handling module 210 may communicate with the scheduling module 212 to discontinue future builds or defer the next scheduled build until, for example, the user is notified and issues a command to continue the scheduled builds. In another embodiment, after detecting an error, the error handling module 210 may communicate with the queuing module 214 to remove any queued portions of the build not yet in progress, thereby terminating the build.

The queuing module 214 manages user build requests using one or more queues, in embodiments. In an embodiment, queuing is sorted by a first-come, first-served priority basis. In other embodiments, queuing is prioritized using factors such as a project type, a requestor, a project size, a project priority, or the like. In an embodiment, the queuing module 214 may communicate with the scheduling module 212 to receive scheduled builds. The queuing module 214 may then insert the scheduled builds into a queue based on one or more of the factors noted above. In an embodiment, queuing is performed at the project level, such that a project may not begin building until a previous project is completed. In another embodiment, queuing is performed at a more granular level, such as at a component or file level. It may be advantageous to manage queues at a finer granularity to reduce build server 220 idle time. In an embodiment, the queuing module 214 communicates with the database 218 to update the build status, For example, the queuing module 214 may communicate with the user interface module 208 to provide an indication of which software project or software component is currently being built, which project or component is next in the queue, or indications of success or error conditions existing in the current software build.

In an embodiment, the file transfer module 216 can transfer source files to one or more build servers 220. Source files may be stored on a file server, removable storage media, or a structured storage system, such as a database, version control system, or the like. In one embodiment, source files are stored in Rational ClearCase provided by IBM, Inc. In an embodiment, the build servers 220 compile the source files to object files. In another embodiment, the build servers 220 manage the distributed compilation of the source files across one or more compilation machines. The file transfer module 216 may then transfer the resultant object file from each build server 220 to another server, which may in some embodiments be the build manager 200, where linking is performed. In an alternative embodiment, linking is performed by one or more build servers 220 and the file transfer module 216 accesses the linked executable file. In either embodiment, the linked executable file is eventually transferred to the development system 204 or the release system 206. In embodiments, file transfers are performed using secured (e.g., Secure Shell (SSH)) or unsecured (e.g., TCP/IP) protocols. In an embodiment, the file transfer module 216 communicates with the database 218 to update the status of file transfers.

Figure 3:
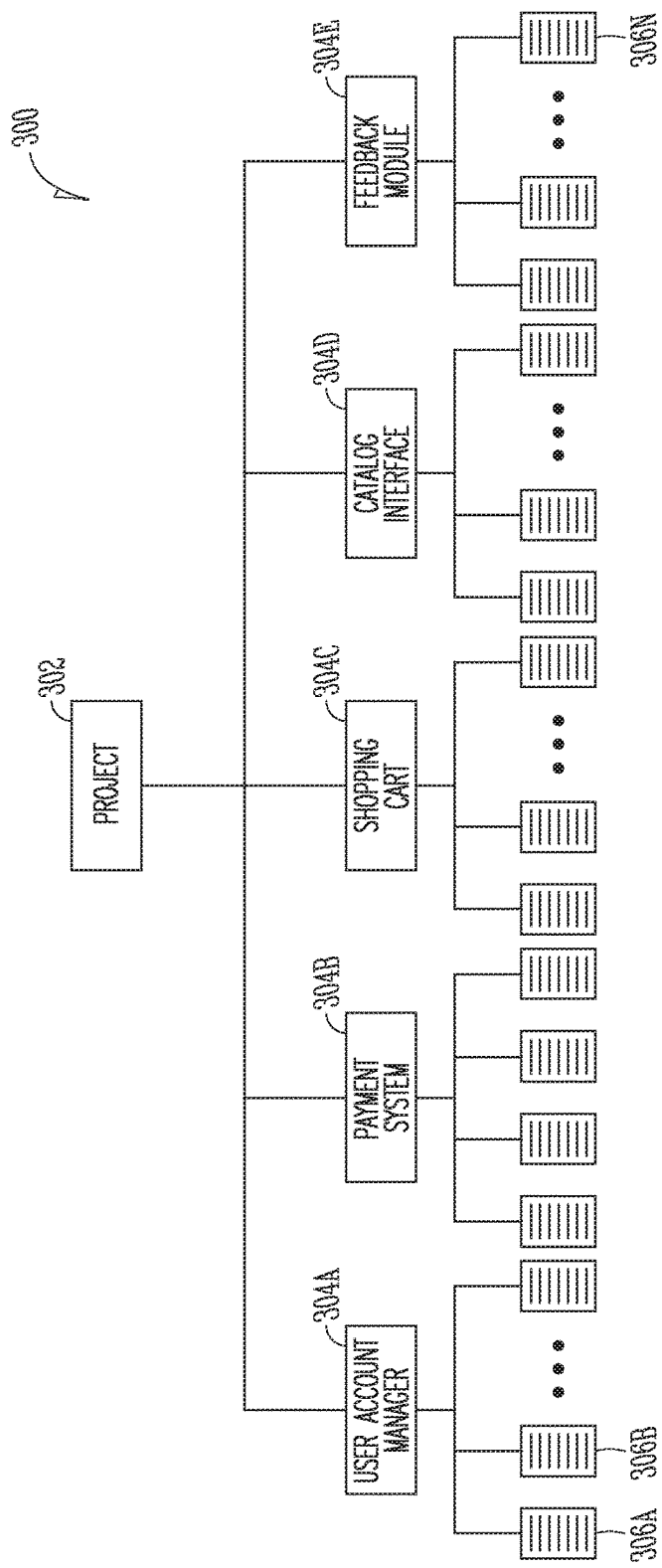
FIG. 3 illustrates a schematic block diagram of a component-based arrangement, in accordance with an example embodiment.

FIG. 3 illustrates a schematic block diagram of a component-based arrangement 300, in accordance with an example embodiment. In an embodiment, a project 302 may be divided into several software components. In one example embodiment, the project may include an online commerce system, where the software components include a user account manager 304A, a payment system 304B, a shopping cart 304C, a catalog interface 304D, and a feedback module 304E. Each component 304 may be logically divided further into separate files or sets of files 306A, 306B, . . . , 306N representing a subdivision of the component 304 related in some manner, such as by related functionality, complexity, or the like. In an embodiment, the subdivided files or sets of files 306 are organized in a manner that increases the speed or efficiency of the build process. For example, one or more complex files may be associated with a more powerful build server 116 (FIG. 1), whereas less complex files may be associated with a less powerful build server 116, in order to seek overall efficiency gains.

Figures 4, 5:
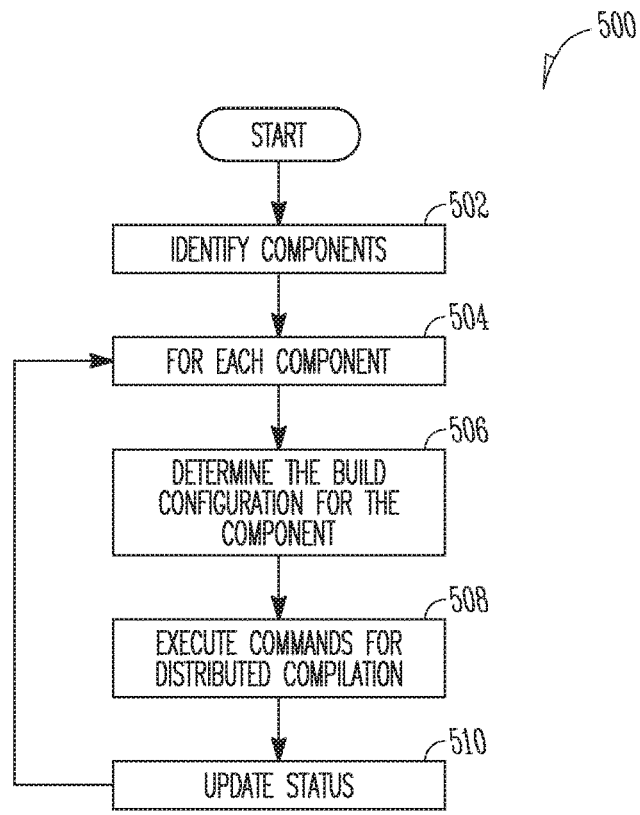
FIG. 4 is a chart illustrating build configurations for software components, in accordance with an example embodiment.
FIG. 5 illustrates a method for component-based distributed parallel builds, in accordance with an example embodiment.

FIG. 4 is a chart 400 illustrating build configurations for software components, in accordance with an example embodiment. As depicted in FIG. 4, a build configuration for a software component includes a mapping from a particular software component to one or more servers. For example, each software component in the component column 402 is associated with one or more computing machines in the server column 404. A command can be issued to compile a component in a distributed manner using the machines identified in the server column 404. In an embodiment, the machines, as described in column 404, include a build server. In another embodiment, the machines include a computing device dedicated to compiling or assembling source code to object code, such as a compilation machine. In an embodiment, a software tool is used to manage and facilitate distributed compilation, such as for example, distcc by Martin Pool. The number of servers and which servers are used for each component may be determined by one or more factors, including the size of the component, the complexity of the component, the computational capability of each build server, the typical frequency of changes to a particular component, the network capabilities to one or more servers, and other factors that may be considered when attempting to optimize build times. In an embodiment, where two or more components are of sufficiently simple complexity to maintain overall build efficiency, portions or all of the components may be compiled or built on a single build server.

In an embodiment, mapping is performed by the build manager 200 on a first-come first-served basis. For example, a list of one or more software components may be submitted to a user interface provided by the user interface module 208. The build manager 200 may process the list of software components from first to last and map each software component to one or more build servers depending on one or more factors, as previously described. The build manager 200 may be aware of how many build servers are available and what each build server's configuration is, for example memory, processing capability, or the like. Using such information, the build manager 200 may adaptively map (assign) software components to build servers in an effort to balance processing duties or an attempt to achieve an overall maximized operating efficiency. In another embodiment, mapping is performed based on one or more characteristics of the software components, such as the size, complexity, age, name, priority, language, or the like. Using characteristics of the software components may be advantageous by providing the best resources to the most complex components before mapping other less complex components, which may not fully maximize a build server's capabilities. In another embodiment, mapping is performed by dividing the number of available build servers by the number of software components and then assigning the allotted number of build servers to each software component.

FIG. 5 illustrates a method 500 for component-based distributed parallel builds, in accordance with an example embodiment. At 502, each component is identified. In one embodiment, a command is issued by a user of the system 100 using a user-interface provided on a terminal machine 106. The command can include an indication of one or more components to build. The method 500 can parse the command to determine the components.

For each component 504, the method 500 determines the build configuration for the component 506. For example, using a table similar to the one illustrated in FIG. 4, the method 500 can determine which build servers 116 (FIG. 1) will be targeted for the distributed compilation of the particular component.

At 508, one or more commands are issued to distributively compile the component. In an embodiment, the command identifies one or more build servers 116 to be used to compile the particular component. In an embodiment, one or more components are built using one or more assigned build servers 116, where building a component includes compiling and linking the component's source files. In another embodiment, component source files are only compiled on build servers 116 in a distributed manner, and linking the resulting object code is performed on a different computer. In another embodiment, build servers 116 control the distributed compilation of one or more components using one or more compilation machines.

At 510, the current build status is updated for later use, for example, by a report or a user-interface screen to be provided to a user showing the current status of each component build.

In certain embodiments, some or all of the builds can be scheduled. In other embodiments, some or all of the builds can be performed in serial, parallel, or a combination. This may be necessary, for example, because of inherent dependencies between different units of software.

In an embodiment, a build is distributed over two or more CPUs in a single machine, such that, for example, each component is assigned and associated with one or more CPUs in the machine. In another embodiment, a machine has a multiple-core CPU (e.g., AMD Athlon X2 series and Intel Pentium D processors) and a build can be distributed over two or more CPU cores in a single machine. In a further embodiment, a machine may have multiple CPUs, each with multiple CPU cores, and systems and methods described herein can adaptively associate and assign components in a project to particular CPUs or CPU cores or any combination of the two. In a further embodiment, builds can be distributed over several multi-processor machines, where each machine's processors may or may not have multiple cores.

Components can then be assigned to a particular processor on a particular machine or even with more granularities, such as by assigning a certain component build to one or more processor cores on a particular machine or across several machines.

Figure 6:
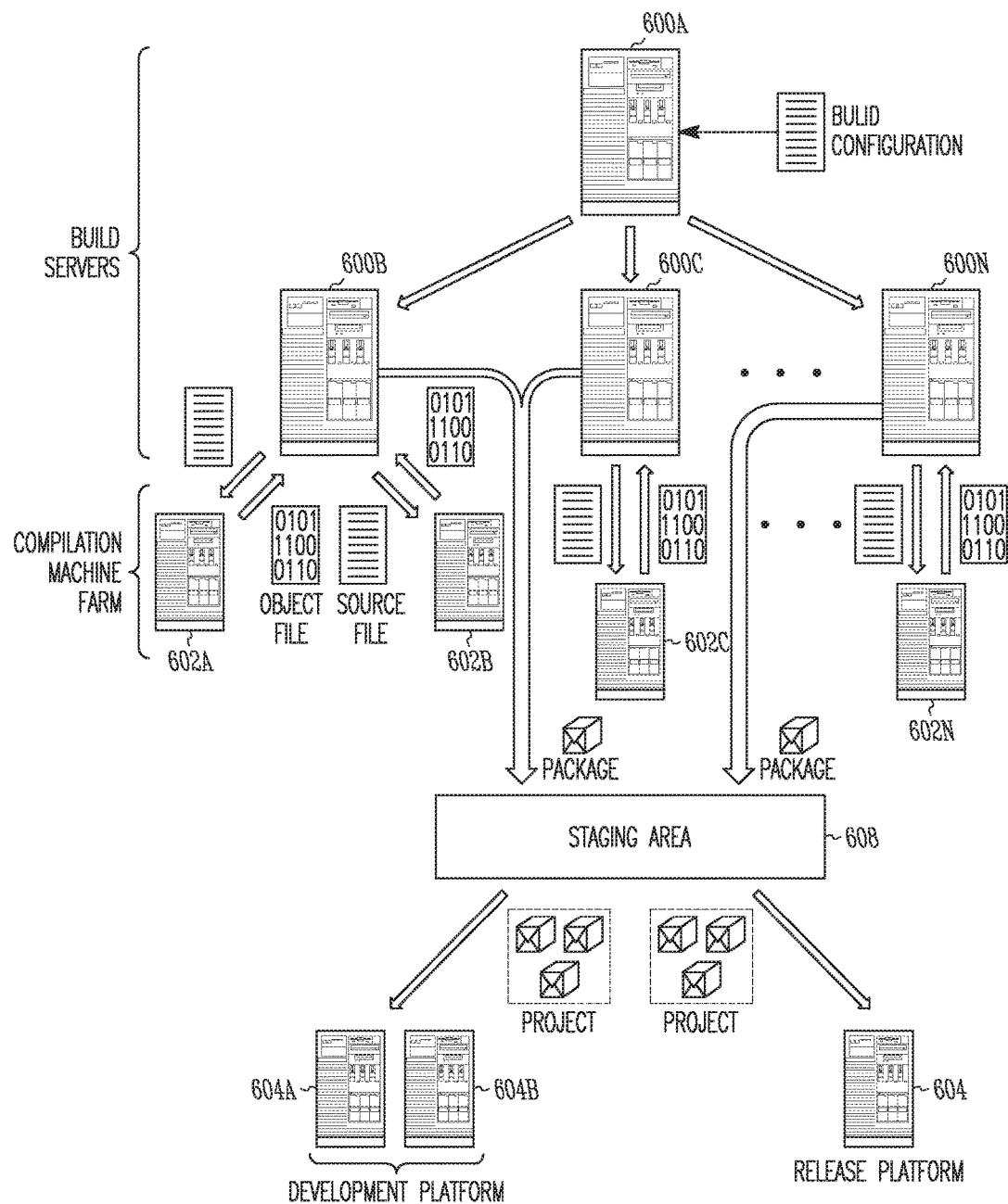
FIG. 6 illustrates a schematic block diagram of build servers and compilation machines, in accordance with an example embodiment.

FIG. 6 illustrates a schematic block diagram of build servers 600 and compilation machines 602, in accordance with an example embodiment. In one configuration, multiple build servers 600A, 600B, 600C, . . . , 600N are arranged in a hierarchal tree, such that a root build server 600A has the task of distributing one or more software components of a software project to one or more component-level build servers 600B, 600C, . . . , 600N in some embodiments, the root build server 600A includes a linker, a packager (e.g., Red Hat Package Manager) and other software to distribute and manage distributed compilations such that the root build server 600A may act as a component-level build server during a separate project build. In an embodiment, the packager includes software to create a software package using a particular file format, such that a management tool can install, update, uninstall, verify and query software packaged in the format. Component-level build servers 600B, 600C, . . . , 600N include a linker, software to distribute and manage distributed compilations, and a packager. Compilation machines 602A, 602B, 602C, . . . , 602N includes one or more compilers and are configured as dedicated machines with a primary task of compiling source code to object code, in an embodiment.

In an embodiment, after a build command is submitted to the root build server 600A, components of the software project are distributed to the component-level build servers 600B, 600C, . . . , 600N. In another embodiment, each component-level build server 600B, 600C, . . . , 600N is provided with a component identifier, such as a component name, and may retrieve the source files associated with the component from a central repository, such as a version control system. At each component-level build server 60013, 600C, . . . , 600N, the source files that are associated with the component are distributed across the compilation machines 602 using software, such as distcc, where the source files are compiled to object files. In one embodiment, a configuration file maps software components to one or more compilation machines 602. The configuration file may be stored in a central repository. When a component-level build server 600B, 600C, . . . , 600N receives a build command identifying the component to build, the associated configuration file may be retrieved and used to determine the target compilation machines 602 for the distributed compilation. After the source files are compiled, the object files are linked at the component-level build server 600B, 600C, . . . , 600N and the resulting software component (e.g., executable file or library file) is packaged using the packager. The package can then be transferred to a development platform 604 or a release platform 606, where it can be installed and used or tested. In an embodiment, development platform 604 may include one or more development servers 604A, 604B to provide parallel development and testing. In an embodiment, packages from component-level build server 600B, 600C, . . . , 600N are mustered at a staging area 608, before being distributed to the development platform 604 or the release 606. In various embodiments, the staging area may include one or more file servers, database servers, or the like, to temporarily store the packages before distribution. The staging area 608 may validate that all packages in a software project are present before transferring the project in the form of a complete set of packages) to the appropriate target platform.

Figure 7:
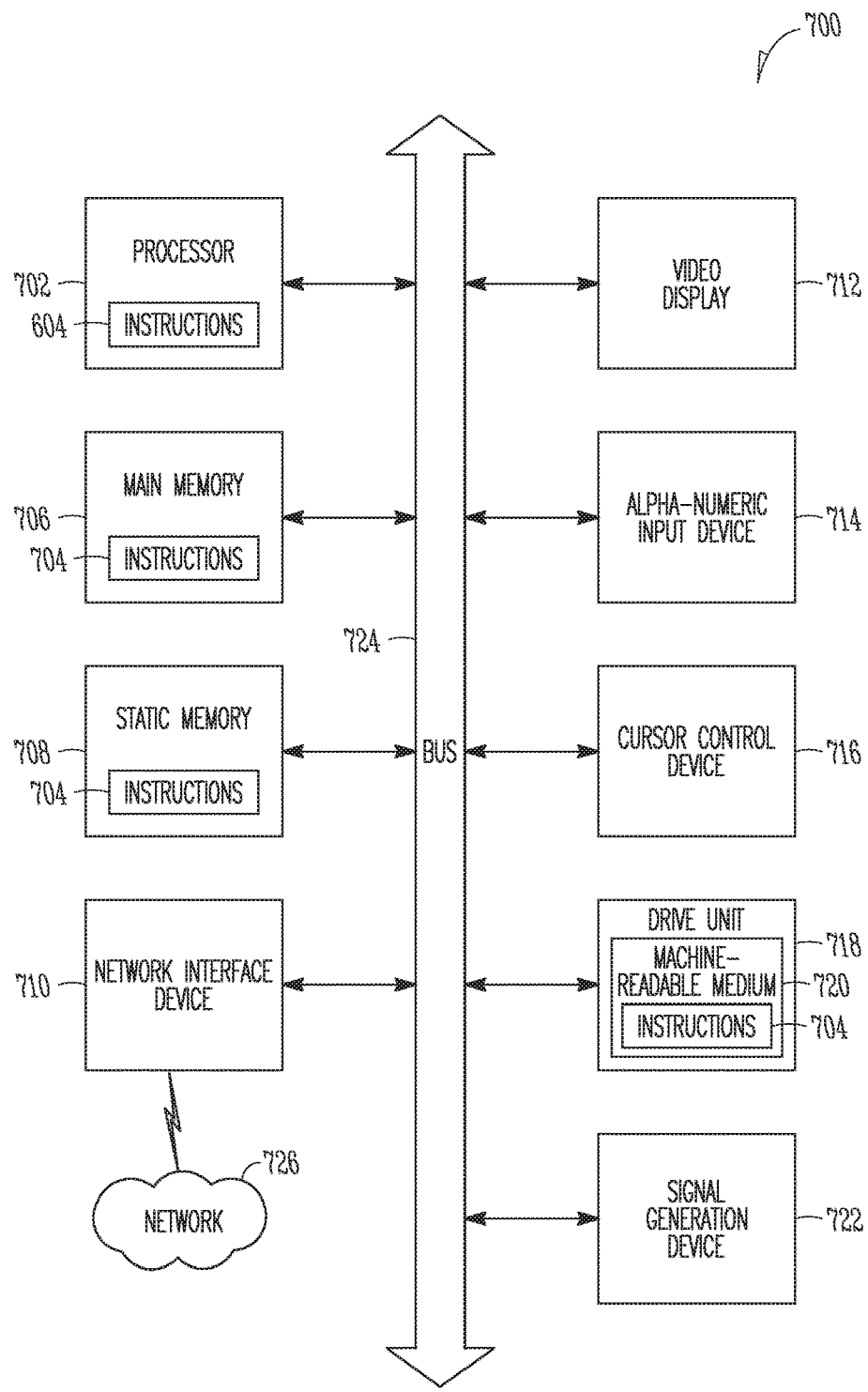
FIG. 7 illustrates a diagrammatic representation of a machine in the exemplary form of a computer system, within which a set or sequence of instructions for causing the machine to perform any one of the methodologies discussed herein may be executed.

FIG. 7 illustrates a diagrammatic representation of a machine in the exemplary form of a computer system 700 within which a set or sequence of instructions, for causing the machine to perform any one of the methodologies discussed herein, may be executed. In alternative embodiments, the machine may comprise a computer, a network router, a network switch, a network bridge, Personal Digital Assistant (PDA), a cellular telephone, a web appliance, set-top box (STB) or any machine capable of executing a sequence of instructions that specify actions to be taken by that machine.

The computer system 700 includes a processor 702, a main memory 706 and a static memory 708, which communicate with each other via a bus 724. The computer system 700 may further include a video display unit 712 (e.g., a liquid crystal display (LCD) or a cathode ray tube (CRT)). The computer system 700 also includes an alphanumeric input device 714 (e.g., a keyboard), a cursor control device 716 (e. g., a mouse), a disk drive unit 717, a signal generation device 722. (e.g., a speaker) and a network interface device 710 to interface the computer system to a network 726.

The disk drive unit 718 includes a machine-readable medium 720 on which is stored a set of instructions or software 704 embodying any one, or all, of the methodologies described herein. The software 704 is also shown to reside, completely or at least partially, within the main memory 706 and/or within the processor 702. The software 704 may further be transmitted or received via the network interface device 710. For the purposes of this specification, the term "machine-readable medium" shall be taken to include any medium which is capable of storing or encoding a sequence of instructions for execution by the machine and that cause the machine to perform any one of the methodologies of the inventive subject matter. The term "machine-readable medium" shall accordingly be taken to include, but not be limited to, solid-state memories, optical and magnetic disks, and carrier wave signals. Further, while the software is shown in FIG. 7 to reside within a single device, it will be appreciated that the software could be distributed across multiple machines or storage media, which may include the machine-readable medium.

The foregoing description of specific embodiments reveals the general nature of the inventive subject matter sufficiently that others can, by applying current knowledge, readily modify and/or adapt it for various applications without departing from the generic concept. Therefore, such adaptations and modifications are within the meaning and range of equivalents of the disclosed embodiments. The phraseology or terminology employed herein is for the purpose of description and not of limitation. Accordingly, the inventive subject matter embraces all such alternatives, modifications, equivalents and variations as fall within the spirit and broad scope of the appended claims.

Method embodiments described herein may be computer-implemented. Some embodiments may include computer-readable media encoded with a computer program (e.g., software), which includes instructions operable to cause an electronic device to perform methods of various embodiments. A software implementation (or computer-implemented method) may include microcode, assembly language code, or a higher-level language code, which further may include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAMS), read only memories (ROMs), and the like.

In the foregoing description of various embodiments, reference is made to the accompanying drawings, which form a part hereof and show, by way of illustration, specific embodiments in which the inventive subject matter may be practiced. Various embodiments are described in sufficient detail to enable those skilled in the art to practice the inventive subject matter, and it is to be understood that other embodiments may be utilized, and that process or mechanical changes may be made, without departing from the scope of the inventive subject matter.

Embodiments of the inventive subject matter may be referred to, individually and/or collectively, herein by the term "inventive subject matter" merely for convenience and without intending to voluntarily limit the scope of this application to any single inventive subject matter or inventive concept if more than one is, in fact, disclosed. It will be recognized that the methods of various embodiments can be combined in practice, either concurrently or in succession. Various permutations and combinations may be readily apparent to those skilled in the art.

The invention claimed is:

1. A system for managing software component builds, comprising:
   a hardware processor;
   a memory comprising instructions which, when executed by the processor, cause the system to:
   access multiple files associated with a software component;
   map the software component to a subset of a set of build servers based on a typical frequency of changes to the software component; and
   build the software component by using each build server, of the subset of build servers, to compile one or more of the multiple files.

2. The system of claim 1, further comprising instructions which, when executed by the processor, cause the system to:
   determine a level of complexity of each of the multiple files;
   determine a level of power of each of the build servers;
   map each of the multiple files to a build server, of the subset of build servers, by mapping one or more of the multiple files with a higher level of complexity to a build server with a higher power level; and
   compile one or more of the multiple files by using each build server, of the subset of build servers, to compile the one or more files that are mapped to the build server.

3. The system of claim 1, further comprising instructions which, when executed by the processor, cause the system to schedule one or more of the builds.

4. The system of claim 3, wherein the scheduling is based on a build requester or a build request time of each of the scheduled builds.

5. The system of claim 3, wherein the scheduling is based on build type or a build size of each of the scheduled builds.

6. The system of claim 1, further comprising instructions which, when executed by the processor, cause the system to detect one or more error conditions and perform one or more actions in response to the detected error conditions.

7. The system of claim 6, wherein the actions include one or more of reporting the error condition, logging the error condition, or ignoring the error condition.

8. A method for managing software component builds, comprising:
   accessing multiple files associated with a software component;
   mapping the software component to a subset of a set of build servers based on a typical frequency of changes to the software component; and
   building the software component by using each build server, of the subset of build servers, to compile one or more of the multiple files.

9. The method of claim 8, further comprising:
   determining a level of complexity of each of the multiple files;
   determining a level of power of each of the build servers;
   mapping each of the multiple files to a build server, of the subset of build servers, by mapping one or more of the multiple files with a higher level of complexity to a build server with a higher power level; and
   compiling one or more of the multiple files by using each build server, of the subset of build servers, to compile the one or more files that are mapped to the build server.

10. The method of claim 8, further comprising scheduling one or more of the builds.

11. The method of claim 10, wherein the scheduling is based on a build requester or a build request time of each of the scheduled builds.

12. The method of claim 10, wherein the scheduling is based on build type or a build size of each of the scheduled builds.

13. The method of claim 8, further comprising detecting one or more error conditions and perform one or more actions in response to the detected error conditions.

14. The method of claim 13, wherein the actions include one or more of reporting the error condition, logging the error condition, or ignoring the error condition.

15. A non-transitory machine-readable medium comprising instructions which, when executed by a processor of the machine, cause the machine to manage software component builds by:
   accessing multiple files associated with a software component;
   mapping the software component to a subset of a set of build servers based on a typical frequency of changes to the software component; and
   building the software component by using each build server, of the subset of build servers, to compile one or more of the multiple files.

16. The machine-readable medium of claim 15, further comprising instructions which, when executed by the processor, cause the machine to manage software component builds by:
   determining a level of complexity of each of the multiple files;
   determining a level of power of each of the build servers;
   mapping each of the multiple files to a build server, of the subset of build servers, by mapping one or more of the multiple files with a higher level of complexity to a build server with a higher power level; and
   compiling one or more of the multiple files by using each build server, of the subset of build servers, to compile the one or more files that are mapped to the build server.

17. The machine-readable medium of claim 15, further comprising instructions which, when executed by the processor, cause the machine to manage software component builds by scheduling one or more of the builds.

18. The machine-readable medium of claim 17, wherein the scheduling is based on a build requester or a build request time of each of the scheduled builds.

19. The machine-readable medium of claim 17, wherein the scheduling is based on build type or a build size of each of the scheduled builds.

20. The machine-readable medium of claim 15, further comprising instructions which, when executed by the processor, cause the machine to manage software component builds by detecting one or more error conditions and performing one or more actions in response to the detected error conditions.

* * * * *